United States Patent [19]

Lepperhoff et al.

[11] Patent Number: 4,948,403

[45] Date of Patent: Aug. 14, 1990

[54] FILTER SYSTEM FOR THE REMOVAL OF ENGINE EMISSION PARTICULATES

[75] Inventors: Gerhard Lepperhoff, Eschweiler; Georg Lütkemeyer, Würselen, both of Fed. Rep. of Germany

[73] Assignee: FEV Motorentechnik GmbH & Co. KG, Aachen, Fed. Rep. of Germany

[21] Appl. No.: 407,112

[22] Filed: Sep. 14, 1989

[51] Int. Cl.[5] ................................................ B01D 46/00

[52] U.S. Cl. ........................................ 55/282; 55/466; 55/523; 55/DIG. 30; 60/311

[58] Field of Search ................. 55/466, 267, 282, 523, 55/DIG. 30; 60/311

[56] References Cited

U.S. PATENT DOCUMENTS

| | | | |
|---|---|---|---|
| 4,427,418 | 1/1984 | Kogiso et al. | 55/523 |
| 4,512,786 | 4/1985 | Sakurai et al. | 55/466 |
| 4,872,889 | 10/1989 | Lepperhoff et al. | 55/466 |

*Primary Examiner*—Bernard Nozick

*Attorney, Agent, or Firm*—Watson, Cole, Grindle & Watson

[57] ABSTRACT

A filter system for removing particulates from exhaust gases of an internal combustion engine, in particular a diesel engine, having at least one filter member formed by filter channels in the configuration of a honeycomb, and made of porous filter material, in which the region of the inlet openings of the filter channels open on the gas intake side, electrical resistance looped heating elements being arranged that are connected via a lead-in and a lead-out to a power supply. A positive positioning of the heating elements and their connections is assured and false contacts, such as short-circuits, are avoided. The resistance heating elements are connectd to a support element connected to the power supply, and the position of the support element can be adjusted three-dimensionally while maintaining a maximum distance of about 30 mm. from the surface of the filter member at its gas intake side.

4 Claims, 2 Drawing Sheets

FILTER SYSTEM FOR THE REMOVAL OF ENGINE EMISSION PARTICULATES

RELATED APPLICATION

This application relates to U.S. Ser. No. 179,647, filed Apr. 8, 1988 now U.S. Pat. No. 4,872,889, and commonly owned herewith.

BACKGROUND OF THE INVENTION

This invention relates to a filter system for removing particulates from the exhaust gases of an internal combustion engine, in particular a diesel engine, having at least one filter member formed by honeycomb filter channels and made of a porous filter material, whereby electrical resistance heating elements, which are connected via a lead-in and a lead-out to a power supply are mounted in the region of the intake openings of the filter channels, open on the gas intake side.

In order to reduce the emission of particulates, particularly in diesel engines, various types of exhaust aftertreatment systems are known. Usually they comprise filter systems which retain and collect the particulates in the exhaust gas. The particulates, retained in the filter, may lead to an increase in the flow resistance in the exhaust system so that the exhaust back pressure of the engine increases. This in turn leads to an increase in fuel consumption and in extreme cases to engine failure. Therefore, it is necessary to remove the particulates deposited in the filter, for example, by means of oxidation at high temperatures.

Honeycomb filters of a porous ceramic material have proven themselves to be suitable as a filter member for retaining the soot particles. These honeycomb filters are formed by a plurality of parallel filter channels, which are closed alternately on the gas inlet side and the gas discharge side so that the exhaust gases must flow through the porous filter walls and thus the particulates are deposited on the walls of the filter channels. The filter can be regenerated by incinerating the accumulated particulates.

The temperature required to ignite the soot particles is not attained sufficiently often so that regeneration is not assured. Automatic regeneration can be attained by a supply of additional energy. An energy-efficient regeneration can be attained if in the inlet region of the filter channels the particulates, deposited in the filter member, are ignited punctually by means of a short-term supply of energy. The energy that is then released by the initial incineration of the particulates can then lead to a self-supporting incineration of the particulates in the filter member. The layer of particulates can be ignited by means of looped resistance wires positioned in the openings of the filter channels. In order to facilitate complete regeneration, the loops of the conductor must be inserted into as many filter channels of the honeycomb filter as possible. The number of filter channels, which can be provided with loops, is limited by the electrical resistance of the conductor.

With a 12 V. supply voltage, which is common in vehicles, the length of the conductor ranges from 15 to 25 cm., of which 10 to 15 loops can be bent. Ceramic honeycomb filters have approximately 1,000 channels, which have to be heated. In order to heat the filter as completely as possible, a large number of individual heating wires bent in the shape of loops are inserted parallel and connected. In order to regenerate the entire filter simultaneously, a large quantity of heat is required, which cannot be supplied by the electrical wiring system of the vehicle. Thus, the quantity of heat can be supplied only by sequential regeneration of individual subregions of the filter. An example of this is known from U.S. Pat. No. 4,427,418.

The loop-shaped bent conductors must be interconnected into small groups to facilitate carrying out sequential regeneration. The individual groups are electrically separated from one another and connected to the supply voltage of the vehicle in such a manner that they can be switched on independently of one another. The distance between the individual connections, which must be electrically insulated from one another, is very small due to the small cross-section of the filter channels of approximately 2×2 mm. Any contact between the individual connections would result in a short-circuit while the vehicle was operating, or several areas would be energized with a power consumption that is too high for the electrical system of the vehicle. If heating wires migrate, it can also result in a bridging of individual loops. The result is that the electrical resistance of the conductor drops, whereby the temperature of the conductors rises and the wires can burn through.

SUMMARY OF THE INVENTION

The object of the invention is to provide a regeneration system for diesel engine particulate filters of the aforedescribed type in which a firm positioning of the heating elements and the looped wires in the honeycomb filter is assured so that false contacts, in particular short-circuits, are avoided.

The secure retention of the heating elements in the filter presents problems especially at the ends of the heating elements. As mentioned above, several heating elements must be electrically interconnected, and it must be possible to provide the necessary electrical energy to a sufficiently large cross-section for carrying out the filter regeneration.

According to the invention, several resistance heating elements are connected to a connector element spaced a predetermined distance from the gas intake side of the filter. Such element is capable of adjustment in directions parallel to the gas intake side and in a direction toward and away from the gas intake side while maintaining such predetermined distance for thereby maintaining the positioning of the heating elements relative to the inlet openings of the filter. Such a distance is about 30 mm. maximum from the gas intake side of the filter.

The connector element is mounted on the filter by a cover plate which supports a hollow coupling extending through a bore located in the cover plate. The coupling has an opening eccentric to the bore, and an elongated rod lies substantially parallel to the filter passages and extends through such opening. The rod is connected to the coupling and to the connector element, and the coupling is rotatable about the axis of the bore for effecting the movement of the connector element in such directions parallel to the gas intake side of the filter.

The coupling is threaded into the bore for effecting the movement of the support plate in the direction toward and away from the intake side. And, the coupling has external threads of fine pitch cooperating with internal threads of fine pitch provided on the bore.

DETAILED DESCRIPTION OF THE INVENTION

Figure 1:
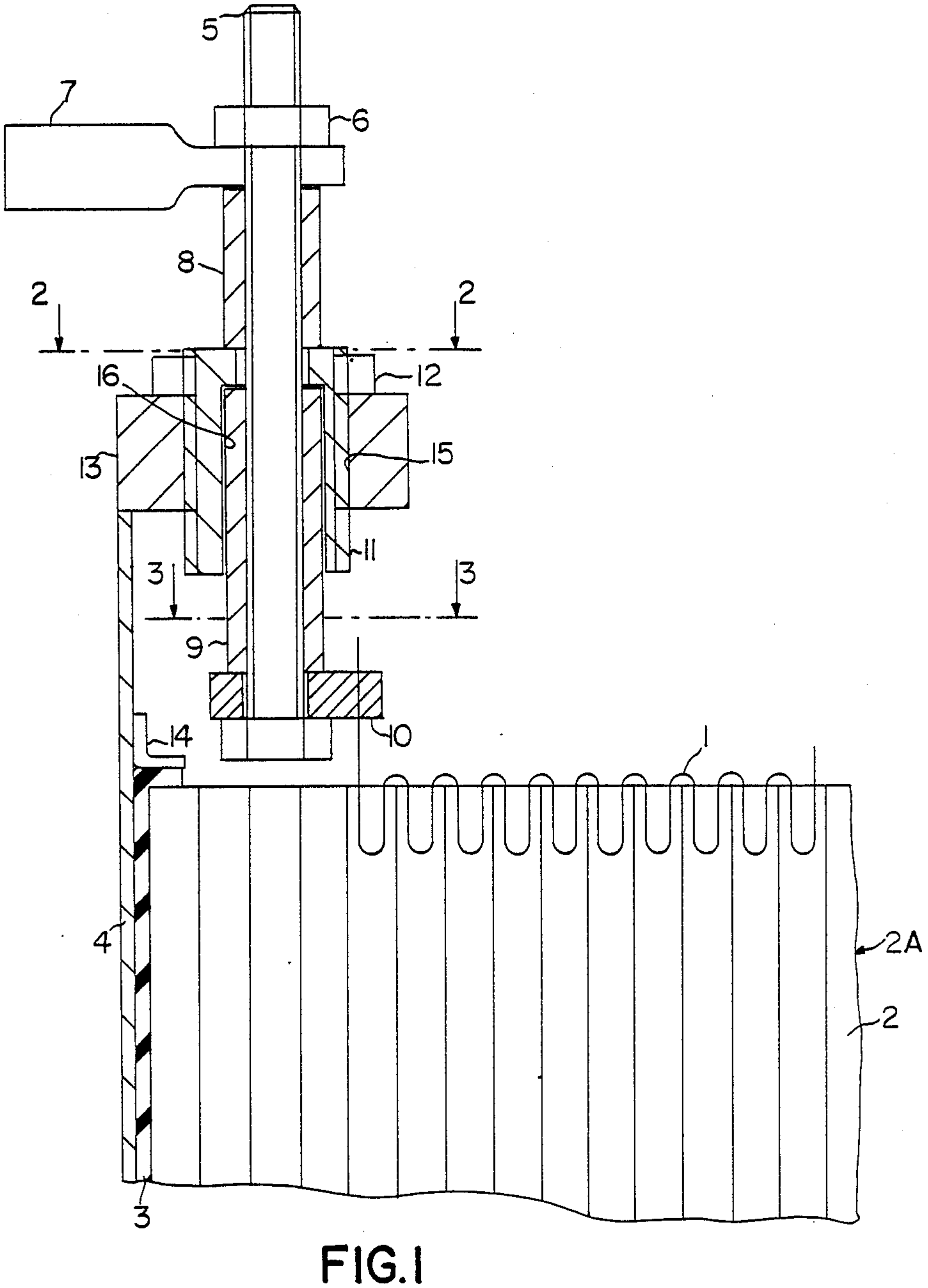
FIG. 1 is a fragmentary side view, partly in section, of the filter system according to the invention.
Figure 2:
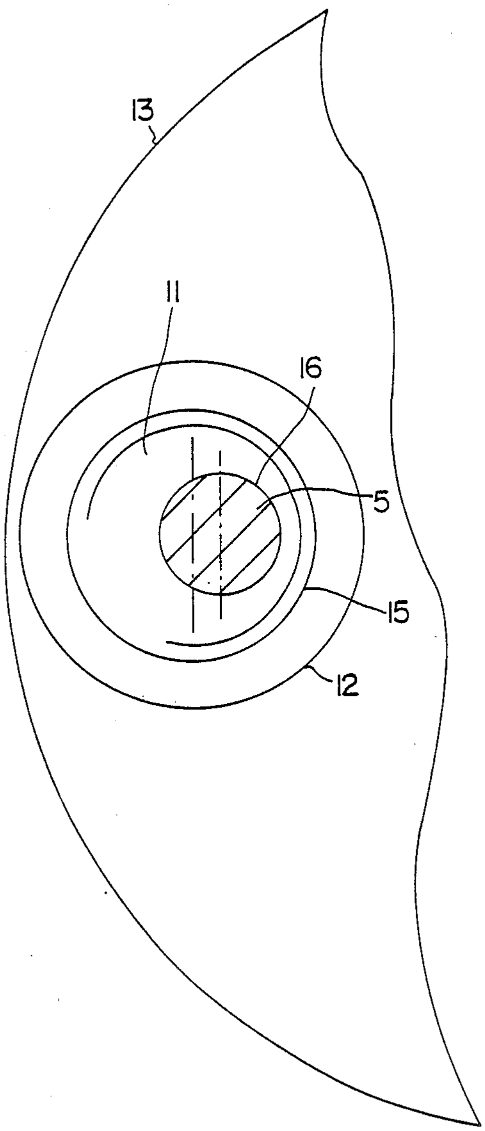
FIG. 2 is a sectional view, at a slightly enlarged scale, taken substantially along the line 2—2 of FIG. 1.

As seen in FIGS. 1 and 2, resistance heating elements 1, having loop-shaped wire portions, extend into several inlet openings 2 of filter member 2A at the gas intake side of the filter for heating and igniting the trapped particulates, the heating elements being maintained firmly in position while the vehicle is operating. Filter element 2A is mounted within a housing 4 by an annular, angular support plate 14, and an insulating mat 3 is interposed between the filter member and the housing.

The filter member is of known honeycomb construction of a porous filter material having generally parallel inlet passages or openings 2 and outlet passages for the gases, particulates for the gases being trapped on some of the surfaces of the inlet passages. The outlet passages are plugged closed at the gas intake side, and the inlet passages, which alternate with the outlet passages, are plugged closed at the gas discharge side of the filter.

Figure 3:
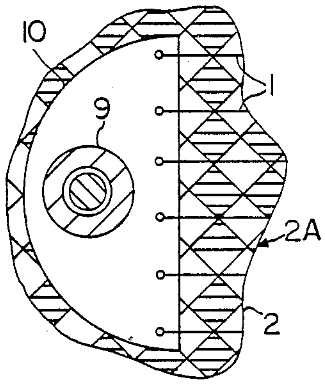
FIG. 3 is a sectional view taken substantially along the line 3—3 of FIG. 1.

As more clearly seen in FIG. 3, several heating elements 1 are connected, for example, by soldering or welding, at their ends to a relatively small, electrically conductive connection element 10 which may be in the form of a crescent-shaped plate as shown. It is important that plate 10 be firmly mounted in place at the smallest possible distance relative to the surface of filter member 2A at the gas intake side thereof, in particular no more than about 30 mm. This arrangement assures that the heating elements or their connecting ends will not deform in such a manner during the passage of electrical current and corresponding heat that the stability of the system is endangered and that false electrical contacts can occur.

An elongated rod, such as an externally threaded bolt 5, extends through a suitable opening in plate 10 and is fixedly secured to plate 10 in some suitable manner as by welding. Bolt 5 is enclosed by a sleeve 9 of electrically non-conducting material, such as ceramic. The sleeve is fixedly secured to the bolt in some suitable manner, as by an adhesive.

There are problems which may arise with filter systems having a honeycomb structure in that the geometric shape of the filter member is not made completely uniform. Moreover, it may not be possible to mount the filter member relative to the wall of housing 4 always in the identical location as intended. Tolerances of this type are extremely critical for the reasons mentioned, in particular given the fact that the size of the filter channel openings are 2×2 mm. And, it is not always possible during manufacturing and assembly to mount plate 10 at the precise distance from the surface of the filter member at the gas intake side.

To avoid problems of this type, rod 5 is mounted on housing 4 for movement in directions parallel to the surface of the filter member at the gas intake side by the provision of a threaded hollow coupling 11 which extends through a bore 15 in a cover plate 13, the coupling having an opening 16 eccentric to the bore, as more clearly seen in FIG. 2. The rod with its sleeve 9 extends through the coupling as shown, the sleeve being connected to the coupling in some normal manner to effect three-dimensional movement of plate 10 upon rotation of the coupling in either direction.

The coupling is screw threaded within opening 15 of the cover plate, such that the distance of plate 10 relative to the surface of the filter member at its gas intake side can be adjusted by rotation of the coupling in either direction. The threaded coupling may have external threads of fine pitch which cooperate with fine pitch inner threads at opening 15 of cover plate 13. In such manner plate 10 for the heating elements can be adjusted in a direction toward and away from the gas intake side of the filter, and in directions parallel to the intake side of the filter upon rotation of the coupling, in a very precise and reliable manner and can be maintained in its intended position.

As seen in FIGS. 1 and 2, threaded coupling 11, which is threaded into cover plate 13, has an eccentric bore 16 through which rod 5 and its sleeve 9 extend, the sleeve being secured to both the rod and to the coupling so that upon coupling rotation in either direction the rod and its plate 10 will shift in three dimensions, i.e., two directions parallel to the gas intake side of the filter, and along a direction toward and away from gas intake side. The external threads of coupling 11 have a very fine pitch so that by a half rotation to the right or to the left a wide range of possible points can be covered without having to adjust the height significantly. However, the height can be adjusted with several rotations of the coupling. Following the required adjustment the threaded coupling is firmly positioned by means of a lock nut 12.

Rod 5 with its insulating sleeve 9 is adjusted toward and away from the gas intake side of the filter by means of threaded coupling 11. Another insulating sleeve 8 surrounds rod 5. Rod 5, nut 6, cable lug 7, insulating sleeves 8 and 9, plate 10 and threaded coupling 11 are clamped together with conventional cable lug 7 and nut 6. The electrical power supply (not shown) of the heating elements is transmitted via cable lug 7, rod 5 and support plate 10. The free ends of the heating elements are connected to ground in the normal manner.

By connecting the heating elements to plate 10, and because of the narrow spacing of plate 10 of less than or equal to 30 mm. from the heating elements in the surface of the filter element, the loop-shaped heating elements with their end connections are prevented in a reliable manner from migrating out of their intended positions at the intake side of the filter, and thus the risk of false contacts is eliminated. The three-dimensional adjustment of plate 10 and the insulation of rod 5 enables a reliable compensation for manufacturing tolerances.

It is self-evident that the invention is not restricted to the illustrated and described constructive embodiment and that the reference numerals serve only for the purpose of explaining, not restricting, the invention. For example, it is possible to use a connector plate of another type as, for example, in the form of a rod, a pipe or some other suitable shape, without departing from the invention.

What is claimed is:

1. A filter system for removing particulates from exhaust gases of an internal combustion engine, in particular a diesel engine, comprising at least one filter frame including a filter member in the configuration of a honeycomb of a porous filter material having generally parallel inlet and outlet passages for the gases, particulates for the gases being trapped on some of the surfaces of said inlet passages, said outlet passages being plugged closed at the gas intake side of said filter member, said inlet passages having inlet openings facing said gas intake side and being plugged closed at a side opposite said gas intake side, electric resistance heating means comprising a plurality of spaced-apart heating elements each having loop-shaped wire portions extending into several of said inlet openings at said gas intake side for heating and igniting the trapped particulates, a connector element spaced a predetermined distance from said intake side, said element being connected to an electric power supply and being connected to said heating elements, means for mounting said element on said filter frame for movement in directions parallel to said intake side and in a direction toward and away from said intake side while maintaining said predetermined distance for thereby maintaining the positioning of said wire portions relative to said inlet openings.

2. The system according to claim 1, wherein said mounting means comprise a cover plate having a bore, a hollow coupling extending through said bore, said coupling having an opening eccentric to said bore, and an elongated rod lying substantially parallel to said passages and extending through said opening, said rod being connected to said coupling and to said connector element, and said coupling being rotatable about the axis of said bore for effecting the movement of said connector element in said directions parallel to said intake side.

3. The system according to claim 2, wherein said coupling is threaded into said bore for effecting the movement of said connector element in said direction toward and away from said intake side.

4. The system according to claim 3, wherein said coupling has external threads of fine pitch cooperating with internal threads of fine pitch provided on said bore.

* * * * *